United States Patent
Shet et al.

(10) Patent No.: US 10,834,584 B2
(45) Date of Patent: Nov. 10, 2020

(54) SYSTEM AND METHOD FOR CONTEXTUAL SERVICE DELIVERY VIA MOBILE COMMUNICATION DEVICES

(71) Applicant: THINXTREAM TECHNOLOGIES PTE. LTD., Singapore (SG)

(72) Inventors: Sanjiv Shrikant Shet, Bangalore (IN); Ranga Raj, Bangalore (IN); Teck Lee Low, Singapore (SG)

(73) Assignee: THINXTREAM TECHNOLOGIES PTE. LTD., Singapore (SG)

( * ) Notice: Subject to any disclaimer, the term of this patent is extended or adjusted under 35 U.S.C. 154(b) by 390 days.

(21) Appl. No.: 14/801,326

(22) Filed: Jul. 16, 2015

(65) Prior Publication Data

US 2017/0019389 A1  Jan. 19, 2017

(51) Int. Cl.
*H04W 4/50* (2018.01)
*H04W 12/06* (2009.01)
*H04L 29/06* (2006.01)
*H04W 4/80* (2018.01)

(52) U.S. Cl.
CPC ............ *H04W 12/06* (2013.01); *H04L 63/08* (2013.01); *H04L 63/10* (2013.01); *H04W 4/50* (2018.02); *H04W 4/80* (2018.02)

(58) Field of Classification Search
CPC ................ G06F 3/1222; G06F 3/1238; H04W 12/06–0609; H04W 4/50; H04W 4/80
See application file for complete search history.

(56) References Cited

U.S. PATENT DOCUMENTS

| | | | |
|---|---|---|---|
| 8,023,968 | B2 | 9/2011 | Wang et al. |
| 9,088,416 | B2 * | 7/2015 | Grigoriev ........... H04L 63/0428 |
| 9,312,926 | B2 * | 4/2016 | Neafsey ............... H04B 5/0056 |
| 2004/0006713 | A1 * | 1/2004 | Minemura ............ H04L 9/3273 726/29 |
| 2005/0044479 | A1 * | 2/2005 | Willams ................ G06F 3/1222 715/273 |
| 2007/0190939 | A1 | 8/2007 | Abel |
| 2008/0045172 | A1 | 2/2008 | Narayanaswami et al. |
| 2008/0307517 | A1 * | 12/2008 | Grigoriev ........... H04L 63/0428 726/9 |
| 2009/0097062 | A1 * | 4/2009 | Hayashi ................ G06F 3/1222 358/1.15 |
| 2009/0143104 | A1 * | 6/2009 | Loh .................. G06Q 20/40145 455/558 |
| 2009/0178118 | A1 * | 7/2009 | Cedo Perpinya ....... H04L 63/08 726/3 |

(Continued)

Primary Examiner — Matthew T Henning
(74) Attorney, Agent, or Firm — Michael D. Eisenberg (57) ABSTRACT

A computer automated system and method comprising configuring a single or plurality of mobile devices over a network, validating the configured devices, and communicating contextual information to the configured devices. The devices are authenticated and the authentication is sent to a server over the network, when a contextual service, controlled/offered by the server through a contextual service point in communication with the server, is invoked by the configured mobile device in the vicinity of the contextual service point. The mobile device is then enabled to consume a contextual service, offered by and delivered at the contextual service point, either from within the mobile device or over the network.

31 Claims, 6 Drawing Sheets

(56) References Cited

U.S. PATENT DOCUMENTS

| | | | |
|---|---|---|---|
| 2010/0005156 A1* | 1/2010 | Wesby | H04L 67/04 |
| | | | 709/219 |
| 2013/0017784 A1 | 1/2013 | Fisher | |
| 2013/0078916 A1 | 3/2013 | Glickman | |
| 2013/0085968 A1* | 4/2013 | Schultz | G06F 21/32 |
| | | | 705/400 |
| 2013/0215467 A1* | 8/2013 | Fein | G06F 3/1204 |
| | | | 358/1.15 |
| 2015/0002870 A1* | 1/2015 | Burke, Jr. | G06F 3/1204 |
| | | | 358/1.13 |
| 2015/0046557 A1* | 2/2015 | Rosenberg | H04W 12/08 |
| | | | 709/213 |

\* cited by examiner

SYSTEM AND METHOD FOR CONTEXTUAL SERVICE DELIVERY VIA MOBILE COMMUNICATION DEVICES

CROSS REFERENCE TO RELATED APPLICATIONS

Not Applicable.

BACKGROUND

Field

In general, the problem is to be able to detect the presence of and authenticate a user in a context, so that some services can be delivered to the user in that context. In the context of secure printing, this translates to releasing print jobs queued by the user when he is near a secure printer. In the context of boarding a plane, this translates to allowing a checked-in passenger through the boarding gate.

Related Art

Earlier, the problem would be solved in the work environment by placing a badge reader (active element) in the context, and the employee authenticating by showing his or her issued badge (passive element). Likewise, in the public space, an encoded token (say a boarding pass with a magnetic strip) would be issued to the user and scanned by a reader at the boarding gate in conjunction with other identity establishing mechanisms.

The issue with these mechanisms were: 1. The reader hardware had to be placed in the context (one per printer or one per boarding gate, for example), and the passive element would be with the user. This would add to the infrastructure cost. 2. The reader hardware had the intelligence to read the user tag, authenticate the user/tag, and release the service.

However, with the proliferation of mobile wireless devices, and especially smart mobile devices, there is an opportunity to swap the active and passive elements, thereby reducing infrastructure cost and consolidating processing and service release at the server.

There now are available, several near field communication protocols, which are supported by the major mobile operating systems. The mobile operating system, in general, monitors the communication channel, and then invokes the relevant app that can handle the communication. NFC is one such widely supported near field technology. The NFC tag is generally passive, and contains the following: a tag id that can be used to uniquely identify the tag; an authentication token that can be used to authenticate the tag itself; an app identifier in a format understood and used by the mobile operating system to invoke the relevant app; and additional context information that can be read by the app itself.

Once the mobile device is in proximity of the NFC tag, the mobile operating system invokes the relevant app and passes all the other parameters above to it for further processing. From a usability perspective, the OS even prompts the user to download and install the relevant app to the user device, if not already present. The app presents the graphical user interface which allows the user to provide his credentials. The app now has three raw pieces of information—the user credentials, the tag info, and the additional context info, in addition to having established presence of the user in the context due to the nature of the technology. The app sends all of the info to the server, which authenticates the user and the tag. Once authenticated, it can use the additional context info to deliver the service in the context.

SUMMARY

Embodiments disclosed include a computer automated system comprising a processor, a memory, and a communication means for communicating over a wired or wireless network. The computer automated system is configured to, over the network, configure a single or plurality of mobile devices, and validate the single or plurality of configured mobile devices. The computer system can further communicate contextual information to the configured single or plurality of mobile devices, authenticate a user of the single or plurality of configured mobile devices, and communicate the contextual information and authentication information to a server over the network. Additionally, based on an authentication status, the computer system is configured to allow the user to consume a contextual service from within the mobile device or over a network.

An embodiment includes, in a computer automated system comprising a processor, a memory, and a communication means for communicating over a wired or wireless network, a method comprising, via the network configuring a single or plurality of mobile devices. The method includes validating the single or plurality of configured mobile devices, communicating contextual information to the configured single or plurality of mobile devices, authenticating a user of the single or plurality of configured mobile devices. The method further includes communicating the context information and authentication information to a server over the network. Additionally, based on an authentication status, the method includes allowing the user to consume a contextual service from within the mobile device or over a network.

An embodiment includes a wireless communication device configured to self-configure based on instructions received over a long range communication network. The device can identify itself to a contextual service provider via the communication network, and further identify a contextual service delivery point via a short range communication means. Based on the identified contextual service delivery point, the device is configured to invoke the contextual service provider's service at the contextual service delivery point via the short range communication means, and further, to cause the contextual service delivery point to deliver the contextual service.

An embodiment includes, in a wireless communication device, a method comprising self-configuring the wireless device based on instructions received over a long range communication network. The method includes identifying the wireless device to a contextual service provider via the communication network, and identifying a contextual service delivery point via a short range communication means. Based on the identified contextual service delivery point, the method includes invoking by the device, the contextual service provider's service at the contextual service delivery point via the short range communication means, and causing the contextual service delivery point to deliver the contextual service.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments disclosed include a computer automated system comprising a processor, a memory, and a communication means for communicating over a wired or wireless network. The computer automated system is configured to, over the network, configure a single or plurality of mobile devices, and validate the single or plurality of configured mobile devices. The computer system can further communicate contextual information to the configured single or plurality of mobile devices, authenticate a user of the single or plurality of configured mobile devices, and communicate the contextual information and authentication information to a server over the network. Additionally, based on an authentication status, the computer system is configured to allow the user to consume a contextual service from within the mobile device or over the network.

Figure 1:
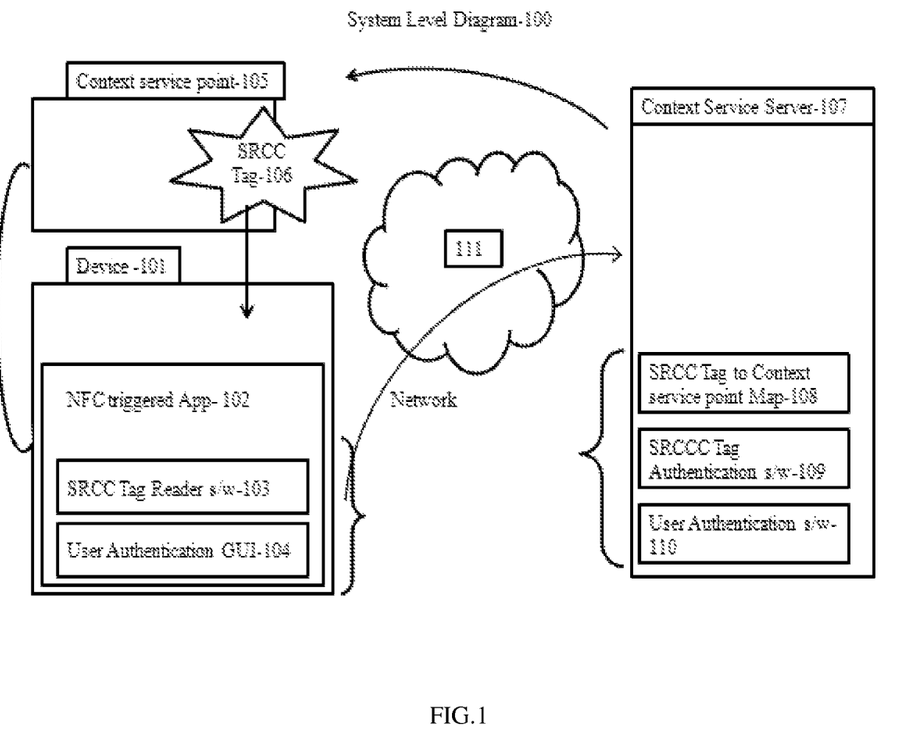
FIG. 1 illustrates the computer automated system according to an embodiment.

FIG. 1 illustrates the computer automated system according to an embodiment. The system 100 includes a single or plurality of mobile devices 101 each of which comprise a short range communication capability (SRCC) and an SRCC triggered application 102, SRCC tag reader software 103 and a user authentication graphical user interface 104. The system includes a contextual service point 105, the location where the contextual service is invoked by the mobile device and is executed and delivered. The contextual service point comprises a passive SRCC tag 106. Additionally, contextual service server 107 comprises an SRCC tag to service point map 108, an SRCC tag authentication software 109, and user authentication software 110. The mobile devices 102 and the contextual service point 105 communicate with contextual service server 107 via communication link 111.

According to an embodiment, the computer system is configured to allow the user to queue a print job to the server via the configured and authenticated single or plurality of mobile devices. Preferably, the print job is invoked via an NFC tag attached to a printer and the configured mobile device, such that the configured mobile device is caused to read the NFC tag and communicate the tag information to the server via the network. In an embodiment, the server is further configured to recognize the user mobile device at the printer, and to identify the printer by authenticating the NFC tag attached to the printer. Further, the server can authenticate the user mobile device at the printer, queue the print job invoked by the user mobile device, and release via the network, instructions to the printer to execute the queued print job. The computer system can configure the mobile devices via the network, wherein the user is authorized to queue a secure print job to the server via the configured and authenticated single or plurality of mobile devices.

According to an embodiment, the secure print job is invoked via an NFC tag attached to a printer and the configured mobile device, such that the configured mobile device is caused to read the NFC tag and communicate the tag information to the server via the network. In the computer system, the server is further configured to recognize the user mobile device at the printer, via the network. The server can also identify the printer. In one embodiment, the printer is identified by authenticating the NFC tag attached to the printer. And the server correspondingly authenticates the user mobile device at the printer. The queued secure print job invoked by the user mobile device, upon authentication of the mobile device, is released to the printer for printing.

Figure 3:
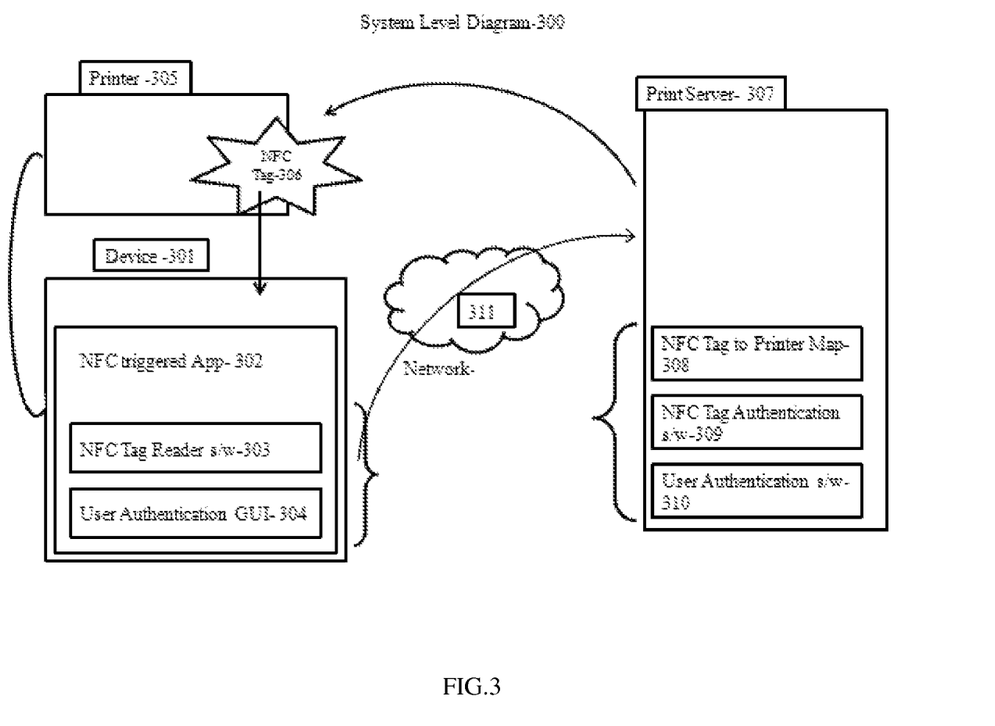
FIG. 3 illustrates an example embodiment of the system for executing a print job.

FIG. 3 illustrates an example embodiment of the system for executing a print job. The system 300 comprises mobile communication device 301 which includes an NFC triggered application 302, which is run by NFC tag reader software 303 and further includes a user authentication graphical user interface 304. Printer 305 also includes NFC tag 306 coupled to the said printer, and both the mobile device 301 and printer 305 comprise means for communicating over the network 311 with print server 307. Print server 307 comprises a directory of printers in the network, mapped to their corresponding NFG tags 308. Further, print server 307 comprises NFC tag authentication software 309, and user authentication software 310.

An alternate embodiment includes a computer system configured to allow the user to board a flight using a mobile application by communicating to the server via the configured and authenticated single or plurality of mobile devices. Flight boarding/check-in is invoked via an NFC tag attached to a flight boarding gate counter. In the embodiment, the configured mobile device, is caused to read the NFC tag and communicate the tag information to an airline server via the network. The server is further configured to recognize the user mobile device at the flight boarding gate counter, and identify the flight boarding gate and flight by authenticating the NFC tag attached to the flight boarding gate counter. Additionally, the server can, via the network, authenticate the user mobile device at the flight boarding gate, and check-in the user for flight boarding invoked by the user mobile device. A checked-in user is then allowed to board the flight, wherein the check-in procedure is invoked by the user mobile device.

Figure 5:
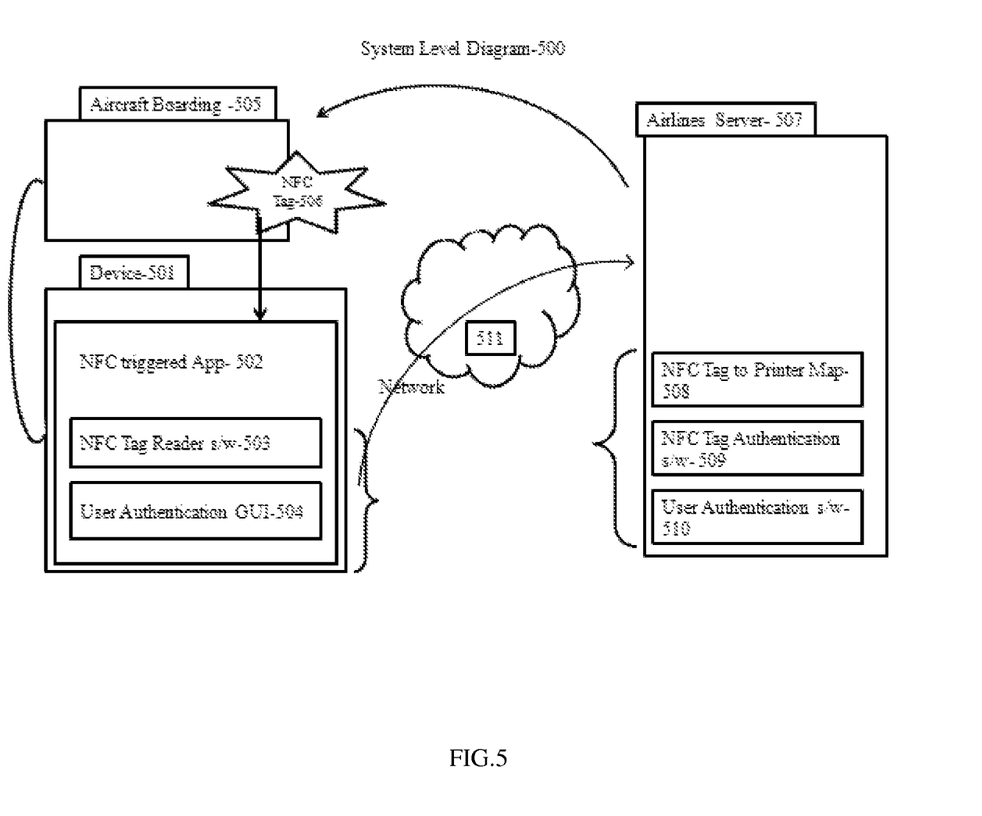
FIG. 5 illustrates an example embodiment of the system for implementing a flight boarding application.

FIG. 5 illustrates an example embodiment of the system for implementing a flight boarding application. The system 500 comprises mobile communication device 501 which includes an NFC triggered application 502, which is run by NFC tag reader software 503 and further includes a user authentication graphical user interface 504. Aircraft boarding point 505 also includes NFC tag 506 coupled to the said Aircraft boarding point, and both the mobile device 501 and Aircraft boarding point 505 comprise means for communicating over the network 511 with Airline server 507. Airline server 507 comprises a directory of Aircraft boarding points in the network, mapped to their corresponding NFG tags 508. Further, Airline server 507 comprises NFC tag authentication software 509, and user authentication software 510.

An embodiment includes, in a computer automated system comprising a processor, a memory, and a communication means for communicating over a wired or wireless network, a method comprising, via the network, configuring a single or plurality of mobile devices. The method further comprises validating the single or plurality of configured mobile devices, and communicating contextual information to the configured single or plurality of mobile devices. The method can include configuring the computer system for authenticating a user of the single or plurality of configured mobile devices, and communicating the contextual and authentication information to a server over the network. Additionally, and based on an authentication status, the method includes allowing the user to consume a contextual service from within the mobile device or over a network.

Figure 2:
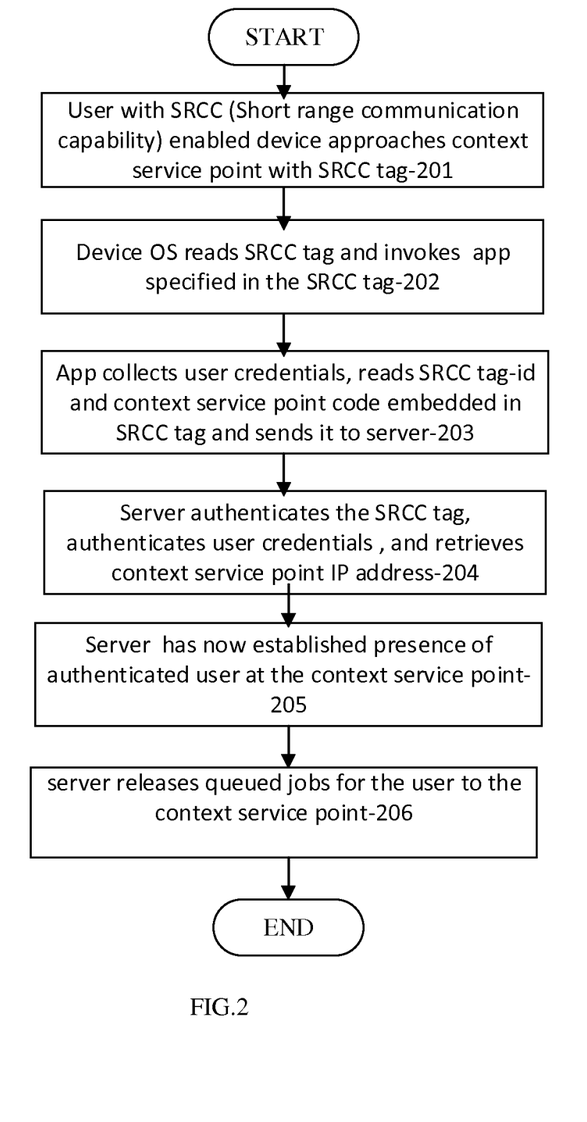
FIG. 2 illustrates a flow diagram according to an embodiment of the method.

FIG. 2 illustrates via a flow diagram an embodiment of the method. Step 201 includes approaching a short range communication vicinity of the contextual service point 105. Step 202 includes reading the passive SRCC tag 106 by the mobile device 101, and based on the read tag, invoking the contextual application 102 in the device. Step 203 includes collecting user credentials, reading the SRCC tag ID and the contextual service point code from the passive SRCC tag by the mobile device, and sending the read information to the server 107 over the network 111. Step 204 includes receiving an authentication message from the server 107 if the SRCC tag, user credentials, and retrieved contextual service point IP address are all authentic. Step 205 includes accepting or rejecting the requesting user, depending on the authenticity check conducted in step 204. If authenticated, step 206 includes releasing a queued service request by the server 107, and executing and delivering the contextual service to the user at contextual service point 105.

According to an embodiment, the method includes allowing the user to queue a print job to the server via the configured and authenticated single or plurality of mobile devices. Preferably, the print job is invoked via an NFC tag attached to a printer and the configured mobile device, such that the configured mobile device is caused to read the NFC tag and communicate the tag information to the server via the network. In an embodiment, the method includes, via the server, recognizing the user mobile device at the printer, and identifying the printer by authenticating the NFC tag attached to the printer. Further according to an embodiment, the method includes, via the server, authenticating the user mobile device at the printer, queuing the print job invoked by the user mobile device, and releasing via the network, instructions to the printer to execute the queued print job. Additionally, the method includes configuring the mobile devices via the network, wherein the user is authorized to queue a secure print job to the server via the configured and authenticated single or plurality of mobile devices.

According to an embodiment, the method includes invoking the secure print job via an NFC tag attached to a printer and the configured mobile device, such that the configured mobile device is caused to read the NFC tag and communicate the tag information to the server via the network. Preferably, in the computer implemented method, the server is further configured for recognizing the user mobile device at the printer, via the network. The server can also identify the printer. In one embodiment, the printer is identified by authenticating the NFC tag attached to the printer. And the server correspondingly authenticates the user mobile device at the printer. The queued secure print job invoked by the user mobile device, upon authentication of the mobile device, is released to the printer for printing.

Figure 4:
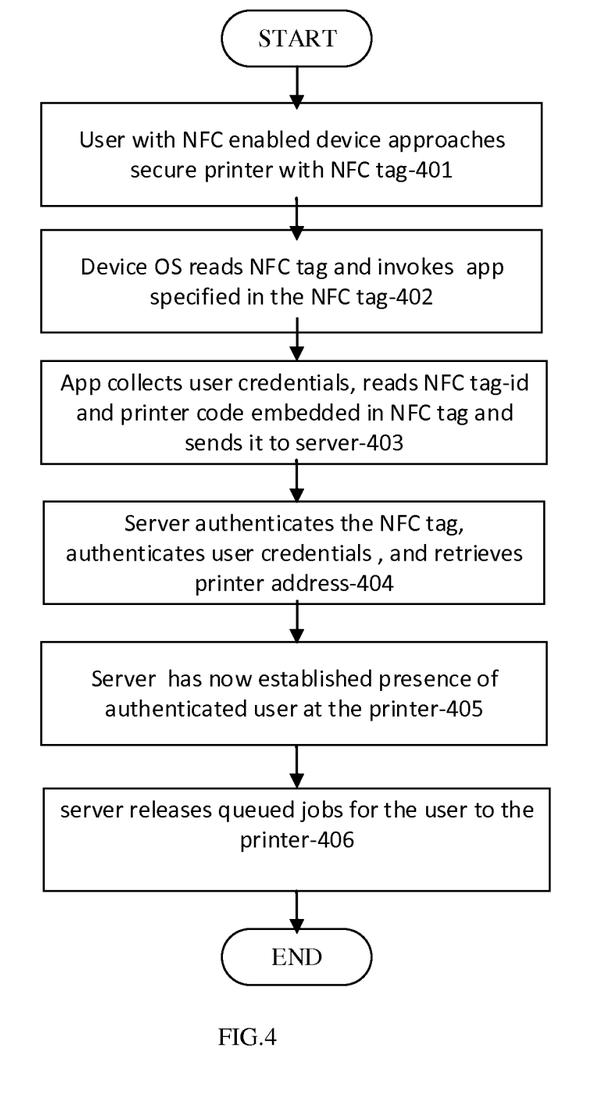
FIG. 4 illustrates via a flow diagram, an example embodiment for executing a print job.

FIG. 4 illustrates via a flow diagram, an example embodiment for executing a print job. Step 401 includes approaching a short range communication vicinity (in this case an NFC tag) of secure printer 305. Step 402 includes reading the NFC tag 306 by the mobile device 301, and based on the read tag, invoking the contextual application 302 in the device. Step 403 includes collecting user credentials, reading the NFC tag ID and the printer code from the NFC tag 306, and sending the read information to the server 307 over the network. Step 404 includes receiving an authentication message from the server 307 if the NFC tag, user credentials, and retrieved printer IP address are all authentic. Step 405 includes accepting or rejecting the requesting user, depending on the authenticity check conducted in step 404. If authenticated, step 406 includes releasing a queued print job by the server 307, and printing the print job at the authenticated printer 305.

An alternate embodiment includes a computer implemented method for allowing the user to board a flight using a mobile application by communicating to the server via the configured and authenticated single or plurality of mobile devices. Flight boarding/check-in is invoked via an NFC tag attached to a flight boarding gate counter and the configured mobile device, such that the configured mobile device is caused to read the NFC tag and communicate the tag information to an airline server via the network. The method includes, via the server, recognizing the user mobile device at the flight boarding gate counter, and identifying the flight boarding gate and flight by authenticating the NFC tag attached to the flight boarding gate counter. Additionally, the method includes, via the network, authenticating the user mobile device at the flight boarding gate, and checking-in the user for flight boarding invoked by the user mobile device. A checked-in user is then allowed to board the flight, wherein the check-in procedure is invoked by the user mobile device.

Figure 6:
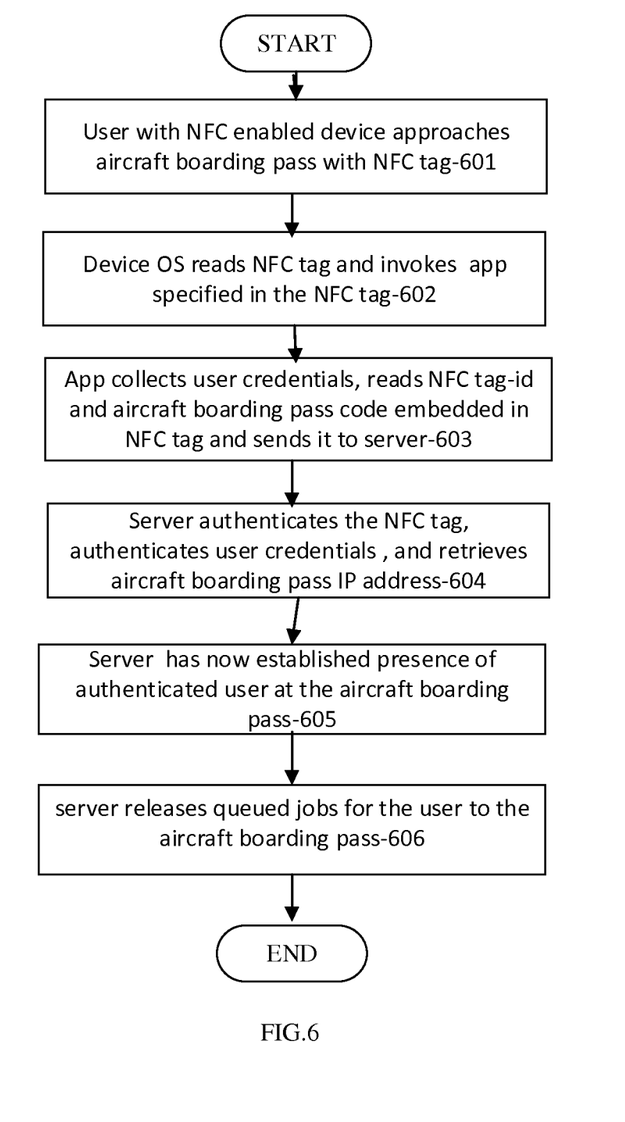
FIG. 6 illustrates via a flow diagram, an example embodiment for implementing the flight boarding application.

FIG. 6 illustrates via a flow diagram, an example embodiment for implementing the flight boarding application. Step 601 includes approaching a short range communication vicinity (in this case an NFC tag) of the aircraft boarding point 505. Step 602 includes reading the NFC tag 506 by the mobile device, and based on the read tag, invoking the contextual application 502 in the device 501. Step 603 includes collecting user credentials, reading the NFC tag ID and the Aircraft boarding point code from the NFC tag, and sending the read information to the server 507 over the network. Step 604 includes receiving an authentication message from the server 507 if the NFC tag, user credentials, and retrieved Aircraft boarding point IP address are all authentic. Step 605 includes accepting or rejecting the requesting user, depending on the authenticity check conducted in step 604. If authenticated, step 606 includes releasing the authenticated requesting user, beyond the boarding point, allowing them to proceed with boarding.

Embodiments disclosed eliminate the need for reader hardware to be coupled to the contextual service point (for example, at each networked printer or at each boarding gate). This is because the user's device now comprises the active element of the short range communications capability, thus drastically reducing the infrastructure cost, thereby consolidating processing and service release at the server.

Example embodiments show how several near field communication protocols, can be combined with mobile operating systems and leveraged to invoke a relevant contextual service at a contextual service point or area, based on a monitored short range communication. Additionally, the major mobile operating systems are leveraged to monitor the communication channel and via passive NFC tags determine a tag id to identify the tag, an authentication token that can be used to authenticate the tag, an application identifier in a format understood and used by the mobile operating system to invoke a relevant application, and any other additional context information that can be read by the application.

Once the mobile device is in proximity of the NFC tag, the mobile operating system invokes the relevant app and passes all the other parameters above to it for further processing. From a usability perspective, the OS even prompts the user to download and install the relevant app to the user device, if not already present. The app presents the graphical user interface which allows the user to provide his credentials. The app now has three raw pieces of information—the user credentials, the tag info, and the additional context info, in addition to having established presence of the user in the context due to the nature of the technology. The app sends all of the information to the server, which authenticates the user and the tag. Once authenticated, it can use the additional context info to deliver the service in the context.

Embodiments disclosed enable pull print solutions, allowing users to queue print jobs to a server for secure printing using a mobile app after authenticating the user. Embodiments enable location agnostic contextual service points (printers, boarding gates, etc.) wherein the server combines information of user identity at a printer with passive SRCC (NFC) tag associated with the printer, identifying both the user and the printer. Embodiments enable queuing of jobs to the server via the user mobile device, and secure release by the server of the queued job at the contextual service point (printer, boarding gate, etc.)

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art that although the preferred and alternate embodiments have been shown and described in accordance with the Patent Statutes, the invention is not limited thereto or thereby.

The figures illustrate the architecture, functionality, and operation of possible implementations of systems and methods according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the steps executed to implement the embodiments of the invention, may be part of an automated or manual embodiment, and programmable to follow a sequence of desirable instructions.

The present invention and some of its advantages have been described in detail for some embodiments. It should be understood that although some example embodiments specifically disclose systems and methods of contextual services using near field communication technology, the disclosed system and method is highly reconfigurable, and embodiments include reconfigurable systems that may be dynamically adapted to be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

We claim:

1. A computer automated system comprising:
   a processor;
   a memory;
   encoded instructions stored in the memory which when implemented by the processor cause the computer automated system to:
   authenticate a pre-configured mobile device, wherein the pre-configuration comprises invoking a contextual service application at a contextual service delivery device;
   wherein the invoked contextual service application sends a collected user credential, a read short range communication tag ID comprised in a passive short range communication tag and a context service point code to the computer automated system;
   based on the sent user credential, the short range communication tag ID and the context service point code, authenticate the contextual service delivery device by the authenticated pre-configured mobile device;
   based on the authentication of the contextual service delivery device, retrieve an IP address associated with the contextual service delivery device; and
   release a requested service at the contextual service delivery device.

2. The computer automated system of claim 1 wherein the computer automated system is further caused to: validate the collected user credential with the contextual service delivery device, and authenticate the user.

3. The computer automated system of claim 2 wherein the said contextual service is invoked via a short range communication means, each of which is comprised in the contextual service delivery device such that the pre-configured mobile device communicates contextual information received via the short range communication means to the computer automated system via a network.

4. The computer automated system of claim 3 wherein the computer automated system is further caused to:
   recognize the pre-configured mobile device at the contextual service delivery device;
   identify the contextual service delivery device by authenticating the information received from the short range communication means comprised in the contextual service delivery device;
   authenticate the pre-configured mobile device at the contextual service delivery device, wherein the authentication is based on short range communication tag ID, user credentials, and retrieved contextual service delivery device IP address;

queue the contextual service invoked by the pre-configured mobile device; and release the queued contextual service for delivery at the contextual service delivery device.

5. The computer automated system of claim 3 wherein the contextual service delivery device comprises a printer and the contextual service comprises a print job, invoked via the short range communication means comprised in the printer and the configured mobile device, such that the configured mobile device is caused to communicate information received via the short range communication means to the computer automated system via a network.

6. The computer automated system of claim 5 wherein the contextual service delivery point is a flight boarding counter or gate comprising an NFC tag for communicating with an authenticated user mobile device such that the pre-configured mobile device is caused to read tag information from the NFC tag and communicate the tag information to an airline server via the network.

7. The computer automated system of claim 6 wherein the server is further caused to:
  recognize the pre-configured mobile device at the flight boarding gate counter;
  identify the flight boarding gate and flight by authenticating the NFC tag attached to the flight boarding gate counter;
  authenticate the pre-configured mobile device at the flight boarding gate;
  check-in the user for flight boarding invoked by the pre-configured mobile device; and
  allow the user to board the flight invoked by the user mobile device.

8. The computer automated system of claim 5 wherein the computer automated system is further configured to:
  recognize the pre-configured mobile device at the printer;
  identify the printer selected by the recognized mobile device;
  authenticate the pre-configured mobile device at the printer;
  queue the secure print job invoked by the pre-configured mobile device; and
  release the queued secured print job for secure printing.

9. The computer automated system of claim 2 wherein the configuring comprises configuring the system to allow the user to queue a print job at a participating printer, by the pre-configured and authenticated mobile device.

10. The computer automated system of claim 2 wherein the configuring comprises configuring the system to allow the user to board a flight using a mobile app by communicating to a server by the pre-configured and authenticated mobile device.

11. The computer automated system of claim 1 wherein the system is configured to allow the user to queue a secure contextual service by the pre-configured and authenticated mobile device.

12. The computer automated system of claim 11 wherein the computer automated system is further configured to:
  recognize the pre-configured mobile device at the contextual service device;
  identify the contextual service provider by authenticating the short range communication means comprised in the contextual service device;
  authenticate the pre-configured mobile device at the contextual service device, wherein the authentication is based on short range communication tag ID, user credentials, and retrieved contextual service delivery device IP address;
  queue the secure contextual service invoked by the pre-configured mobile device; and
  release the queued secured contextual service for delivery at the contextual service device.

13. In a computer automated system comprising a processor, a memory, and encoded instructions stored in the memory and implemented by the processor, a method comprising:
  authenticating a pre-configured mobile device, wherein the pre-configuration comprises invoking a contextual service application at a contextual service delivery device;
  wherein the invoked contextual service application sends a collected user credential, a read short range communication tag ID comprised in a passive short range communication tag and a context service point code to the computer automated system;
  based on the sent user credential, the short range communication tag ID and the context service point code, authenticating the contextual service delivery device by the authenticated pre-configured mobile device;
  based on the authentication of the contextual service delivery device, retrieving an IP address associated with the contextual service delivery device; and
  releasing a requested service at the contextual service delivery device.

14. The method of claim 13 further comprising validating the stored user credential with the contextual service delivery device; and authenticating the user.

15. The method of claim 14 further comprising allowing the user to queue a secure contextual service to the computer automated system by the pre-configured and authenticated mobile device.

16. The method of claim 14 wherein the configuring comprises allowing the user to
  board a flight using a mobile app by communicating to a server by the pre-configured and authenticated mobile device.

17. The method of claim 13 further comprising:
  invoking the requested service via a short range communication means comprised in the contextual service delivery device such that the pre-configured mobile device comprises means to communicate contextual information received via the short range communication means to the computer automated system via a network.

18. The method of claim 17, further comprising:
  recognizing the pre-configured mobile device at the contextual service delivery device;
  identifying the contextual service delivery device by authenticating the information captured from the short range communication means comprised in the contextual service delivery device;
  authenticating the pre-configured mobile device at the contextual service delivery device, wherein the authentication of the pre-configured mobile device is based on short range communication tag ID, user credentials, and retrieved contextual service delivery device IP address;
  queuing the contextual service invoked by the pre-configured mobile device; and
  releasing the queued contextual service for delivery at the contextual service delivery device.

19. The method of claim 18 wherein:
  the contextual delivery device is a printing device, and the short range communication means is an NFC tag coupled to the printing device.

20. The method of claim 18 further comprising, via the server:
- recognizing the pre-configured mobile device at the flight boarding gate counter;
- identifying the flight boarding gate and flight by authenticating the NFC tag comprised in the flight boarding gate counter;
- authenticating the pre-configured mobile device at the flight boarding gate;
- checking-in the user for flight boarding invoked by the pre-configured mobile device; and
- allowing the user to board the flight invoked by the user mobile device.

21. The method of claim 17 wherein the configuring comprises allowing the user to queue a print job at a participating printer, by the pre-configured and authenticated mobile device.

22. The method of claim 17 wherein the invoking comprises invoking a print job via an NFC tag comprised in a printer, such that the configured mobile device is caused to read the NFC tag and communicate the tag information to the computer automated system via the network.

23. The method of claim 17 wherein the contextual service delivery point is a flight boarding counter or gate comprising an NFC tag for communicating with an authenticated user mobile device such that the pre-configured mobile device is caused to read tag information from the NFC tag and communicate the tag information to an airline server via the network.

24. A wireless communication device configured to:
- authenticate itself to a computer automated system via a network, based on a pre-configuration wherein the pre-configuration comprises invoking a contextual service application at a contextual service delivery device;
- wherein the invoked contextual service application sends a collected user credential, a read short range communication tag ID comprised in a passive short range communication tag and a context service point code to the computer automated system;
- based on the sent user credential, the short range communication tag ID and the context service point code, authenticate the contextual service delivery device;
- based on the authentication of the contextual service delivery device, cause the computer automated system to retrieve an IP address associated with the contextual service delivery device; and
- trigger the release of a requested service via the computer automated system, at the contextual service delivery device.

25. The wireless communication device of claim 24 wherein the wireless communication device is configured to store a user credential, validate the stored user credential with the contextual service over the network, and to authenticate the user.

26. The wireless communication device of claim 24 wherein the contextual service delivery device is a printer and the contextual service is a print job, invoked via an NFC tag coupled to the printer, such that the configured wireless communication device is caused to read the NFC tag and communicate the tag information to a print server via the network.

27. The wireless communication device of claim 24 wherein the contextual service delivery point is a flight boarding counter or gate comprising an NFC tag for communicating with the wireless communication device such that the wireless communication device is caused to read tag information from the NFC tag and communicate the tag information to an airline server via the network.

28. In a wireless communication device, a method comprising:
- authenticating itself to a computer automated system via a network, based on a pre-configuration wherein the pre-configuration comprises invoking a contextual service application at a contextual service delivery device;
- wherein the invoked contextual service application sends a collected user credential, a read short range communication tag ID comprised in a passive short range communication tag and a context service point code to the computer automated system;
- based on the sent user credential, the short range communication tag ID and the context service point code, authenticating the contextual service delivery device;
- based on the authentication of the contextual service delivery device, causing the computer automated system to retrieve an IP address associated with the contextual service delivery device; and
- triggering the release of a requested service via the computer automated system, at the contextual service delivery device.

29. The method of claim 28 further comprising:
- configuring the device to store a user credential;
- validating the stored user credential with the contextual service over the network; and
- authenticating the user.

30. The method of claim 28 wherein causing the contextual service delivery point to deliver the contextual service comprises causing a networked printer to execute a print job, invoked by the wireless communication device via an NFC tag comprised in the printer, such that the configured wireless communication device is caused to read the NFC tag and communicate the tag information to a print server via the network.

31. The method of claim 28 wherein causing the contextual service delivery point to deliver the contextual service comprises causing a flight boarding counter or gate comprising an NFC tag for communicating with the wireless communication device such that the configured mobile device is caused to read tag information from the NFC tag and communicate the tag information to an airline server via the network.

* * * * *

(12) EX PARTE REEXAMINATION CERTIFICATE (12821st)
United States Patent
Shet et al.

(10) Number: US 10,834,584 C1
(45) Certificate Issued: Jan. 23, 2025

(54) SYSTEM AND METHOD FOR CONTEXTUAL SERVICE DELIVERY VIA MOBILE COMMUNICATION DEVICES

(71) Applicant: THINXTREAM TECHNOLOGIES PTE. LTD., Singapore (SG)

(72) Inventors: Sanjiv Shrikant Shet, Bangalore (IN); Ranga Raj, Bangalore (IN); Teck Lee Low, Singapore (SG)

(73) Assignee: THINXTREAM TECHNOLOGIES PTD. LTD., Singapore (SG)

Reexamination Request:
No. 90/019,581, Jul. 18, 2024

Reexamination Certificate for:
Patent No.: 10,834,584
Issued: Nov. 10, 2020
Appl. No.: 14/801,326
Filed: Jul. 16, 2015

(51) Int. Cl.
H04W 12/06 (2021.01)
H04L 9/40 (2022.01)
H04W 4/50 (2018.01)
H04W 4/80 (2018.01)

(52) U.S. Cl.
CPC .............. *H04W 12/06* (2013.01); *H04L 63/08* (2013.01); *H04L 63/10* (2013.01); *H04W 4/50* (2018.02); *H04W 4/80* (2018.02)

(58) Field of Classification Search
None
See application file for complete search history.

(56) References Cited

To view the complete listing of prior art documents cited during the proceeding for Reexamination Control Number 90/019,581, please refer to the USPTO's Patent Electronic System.

*Primary Examiner* — Jalatee Worjloh

(57) ABSTRACT

A computer automated system and method comprising configuring a single or plurality of mobile devices over a network, validating the configured devices, and communicating contextual information to the configured devices. The devices are authenticated and the authentication is sent to a server over the network, when a contextual service, controlled/offered by the server through a contextual service point in communication with the server, is invoked by the configured mobile device in the vicinity of the contextual service point. The mobile device is then enabled to consume a contextual service, offered by and delivered at the contextual service point, either from within the mobile device or over the network.

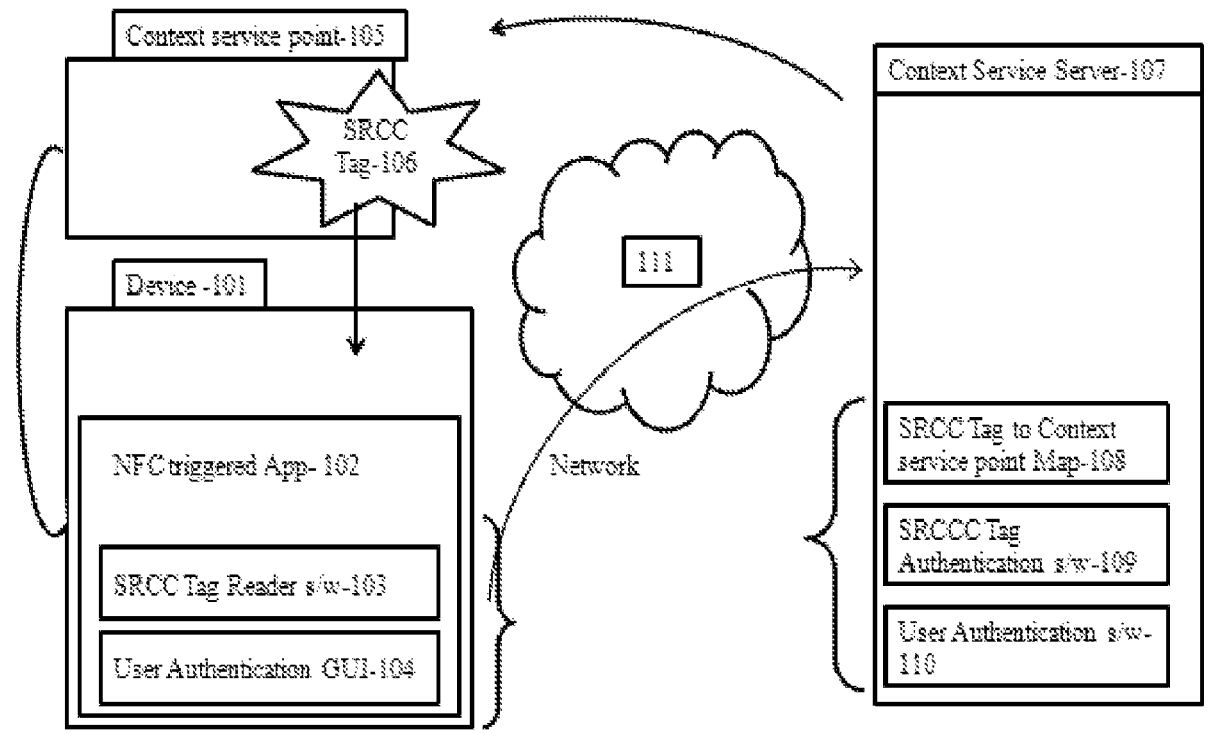

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1, 13, 24 and 28 is confirmed.

Claims 2-12, 14-23, 25-27 and 29-31 were not reexamined.

\* \* \* \* \*